United States Patent
Goto et al.

(10) Patent No.: US 8,155,654 B2
(45) Date of Patent: Apr. 10, 2012

(54) TRANSMISSION RATE CONTROL METHOD, MOBILE COMMUNICATION SYSTEM AND RADIO BASE STATION

(75) Inventors: Yoshikazu Goto, Yokohama (JP); Akihito Hanaki, Yokohama (JP); Takahiro Hayashi, Yokosuka (JP); Junichiro Kawamoto, Tokyo (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 707 days.

(21) Appl. No.: 12/277,571

(22) Filed: Nov. 25, 2008

(65) Prior Publication Data
US 2009/0137242 A1    May 28, 2009

(30) Foreign Application Priority Data
Nov. 26, 2007  (JP) ................ P2007-304991

(51) Int. Cl.
*H04W 72/12* (2009.01)
(52) U.S. Cl. .................. 455/450; 455/452.1
(58) Field of Classification Search ............ 455/456.1, 455/450, 452.1, 452.2, 454; 370/229, 232, 370/235
See application file for complete search history.

(56) References Cited

U.S. PATENT DOCUMENTS
7,783,320 B2 *  8/2010  Usuda et al. ............... 455/522
2007/0248099 A1  10/2007  Liljestrom FOREIGN PATENT DOCUMENTS
| JP | 2006-135992 A | 5/2006 |
| JP | 3895364 B2 | 3/2007 |
| JP | 2007-267070 A | 10/2007 |
| WO | WO 98/45966 A2 | 10/1998 |
| WO | WO 2004/084503 A2 | 9/2004 |
| WO | 2005-039229 A1 | 4/2005 |
| WO | WO 2006100597 A2 * | 9/2006 |

OTHER PUBLICATIONS

The office communication of Apr. 1, 2011, issued in the counterpart Chinese patent application.
3GPP TS25.321 Ver. 7. 5. 0 (Jun. 2007) 3rd Generation Partnership Project; Technical Specification Group Radio Access Network; Medium Access Control(MAC) protocol specification (Release 7).

(Continued)

*Primary Examiner* — Dean O Takaoka
*Assistant Examiner* — Alan Wong
(74) *Attorney, Agent, or Firm* — Marvin A. Motsenbocker; Mots Law, PLLC

(57) ABSTRACT

A transmission rate control method including: notifying, from the mobile station UE to the radio base station NodeB, a data amount in a transmission buffer of the mobile station UE; determining, at the radio base station NodeB, a maximum allowable value that can be notified to the mobile station UE, in accordance with the data amount in the transmission buffer; calculating, at the radio base station NodeB, as a granted value to be notified to the mobile station UE, a value that does not exceed the maximum allowable value, notifying, from the radio base station Node B to the mobile station UE, the granted value calculated at the radio base station UE, by using a transmission rate control channel; and transmitting, at the mobile station UE, the uplink user data, at a transmission rate corresponding to the granted value notified from the radio base station NodeB.

14 Claims, 12 Drawing Sheets

OTHER PUBLICATIONS

Samsung Electronics; "Description of EUL scheduler" 3rd Generation Partenership Project, No. R1-040698, Jun. 21-24, 2004 p. 1-8, XP002510585.

C.Orejuela Mesa, G. Heijenk et al.:"Scheduling in the UMTS enhaced uplink" Cost 290, TD(06)052, Sep. 29, 2006, pp. 1-17, XP002510586.

3rd Generation Partnership Project:"Medium Access Control(MAC) protocol specification (Release 7)" Technical Specification Group Radio Access Network, No. TS25.321 V7.6.0, Sep. 2007, pp. 1-146, XP002510587.

* cited by examiner

PRIOR ART

FIG. 7

| HLID (5 BITS) | TEBS (4 BITS) | HLBS (4 BITS) | UPH (5 BITS) |
|---|---|---|---|

FIG. 8

| INDEX | TEBS VALUE (BYTE) | MAXIMUM ALLOWABLE INCREMENT OF AG |
|---|---|---|
| 0 | TEBS=0 | $(15/15)^2$ |
| 1 | 0<TEBS≦10 | $(24/15)^2$ |
| 2 | 10<TEBS≦14 | $(30/15)^2$ |
| 3 | 14<TEBS≦18 | |
| 4 | 18<TEBS≦24 | |
| 5 | 24<TEBS≦32 | |
| 6 | 32<TEBS≦42 | |
| 7 | 42<TEBS≦55 | |
| 8 | 55<TEBS≦73 | |
| 9 | 73<TEBS≦97 | |
| 10 | 97<TEBS≦129 | |
| 11 | 129<TEBS≦171 | |
| 12 | 171<TEBS≦228 | ⋮ |
| 13 | 228<TEBS≦302 | |
| 14 | 302<TEBS≦401 | |
| 15 | 401<TEBS≦533 | |
| 16 | 533<TEBS≦708 | |
| 17 | 708<TEBS≦940 | |
| 18 | 940<TEBS≦1248 | |
| 19 | 1248<TEBS≦1658 | |
| 20 | 1658<TEBS≦2202 | |
| 21 | 2202<TEBS≦2925 | |
| 22 | 2925<TEBS≦3884 | |
| 23 | 3884<TEBS≦5160 | |
| 24 | 5160<TEBS≦6853 | |
| 25 | 6853<TEBS≦9103 | |
| 26 | 9103<TEBS≦12092 | |
| 27 | 12092<TEBS≦16062 | |
| 28 | 16062<TEBS≦21335 | |
| 29 | 21335<TEBS≦28339 | |
| 30 | 28339<TEBS≦37642 | |
| 31 | 37642<TEBS | $(150/15)^2 \times 6$ |

FIG. 9

| INDEX | TEBS VALUE (BYTE) | MAXIMUM ALLOWABLE INCREMENT OF AG |
|---|---|---|
| 0 | TEBS=0 | 1 |
| 1 | 0<TEBS≦10 | 2 |
| 2 | 10<TEBS≦14 | 4 |
| 3 | 14<TEBS≦18 | |
| 4 | 18<TEBS≦24 | |
| 5 | 24<TEBS≦32 | |
| 6 | 32<TEBS≦42 | |
| 7 | 42<TEBS≦55 | |
| 8 | 55<TEBS≦73 | |
| 9 | 73<TEBS≦97 | |
| 10 | 97<TEBS≦129 | |
| 11 | 129<TEBS≦171 | |
| 12 | 171<TEBS≦228 | ⋮ |
| 13 | 228<TEBS≦302 | |
| 14 | 302<TEBS≦401 | |
| 15 | 401<TEBS≦533 | |
| 16 | 533<TEBS≦708 | |
| 17 | 708<TEBS≦940 | |
| 18 | 940<TEBS≦1248 | |
| 19 | 1248<TEBS≦1658 | |
| 20 | 1658<TEBS≦2202 | |
| 21 | 2202<TEBS≦2925 | |
| 22 | 2925<TEBS≦3884 | |
| 23 | 3884<TEBS≦5160 | |
| 24 | 5160<TEBS≦6853 | |
| 25 | 6853<TEBS≦9103 | |
| 26 | 9103<TEBS≦12092 | |
| 27 | 12092<TEBS≦16062 | |
| 28 | 16062<TEBS≦21335 | |
| 29 | 21335<TEBS≦28339 | |
| 30 | 28339<TEBS≦37642 | |
| 31 | 37642<TEBS | 8 |

FIG. 10

| INDEX | TEBS VALUE (BYTE) | MAXIMUM ALLOWABLE INCREMENT OF AG |
|---|---|---|
| 0 | TEBS=0 | 0 |
| 1 | 0<TEBS≤10 | 0 |
| 2 | 10<TEBS≤14 | 4 |
| 3 | 14<TEBS≤18 | |
| 4 | 18<TEBS≤24 | |
| 5 | 24<TEBS≤32 | |
| 6 | 32<TEBS≤42 | |
| 7 | 42<TEBS≤55 | |
| 8 | 55<TEBS≤73 | |
| 9 | 73<TEBS≤97 | |
| 10 | 97<TEBS≤129 | |
| 11 | 129<TEBS≤171 | . |
| 12 | 171<TEBS≤228 | . |
| 13 | 228<TEBS≤302 | . |
| 14 | 302<TEBS≤401 | |
| 15 | 401<TEBS≤533 | |
| 16 | 533<TEBS≤708 | |
| 17 | 708<TEBS≤940 | |
| 18 | 940<TEBS≤1248 | |
| 19 | 1248<TEBS≤1658 | |
| 20 | 1658<TEBS≤2202 | |
| 21 | 2202<TEBS≤2925 | |
| 22 | 2925<TEBS≤3884 | |
| 23 | 3884<TEBS≤5160 | |
| 24 | 5160<TEBS≤6853 | |
| 25 | 6853<TEBS≤9103 | |
| 26 | 9103<TEBS≤12092 | |
| 27 | 12092<TEBS≤16062 | |
| 28 | 16062<TEBS≤21335 | |
| 29 | 21335<TEBS≤28339 | |
| 30 | 28339<TEBS≤37642 | |
| 31 | 37642<TEBS | 8 |

FIG. 11

| INDEX | AG VALUE |
|---|---|
| 37 | $(168/15)^{2*}$ |
| 36 | $(150/15)^{2*}$ |
| 35 | $(168/15)^{2*}$ |
| 34 | $(150/15)^{2*}$ |
| 33 | $(134/15)^{2*}$ |
| 32 | $(119/15)^{2*}$ |
| 31 | $(150/15)^{2*}$ |
| 30 | $(95/15)^{2*}4$ |
| 29 | $(168/15)^2$ |
| 28 | $(150/15)^2$ |
| 27 | $(134/15)^2$ |
| 26 | $(119/15)^2$ |
| 25 | $(106/15)^2$ |
| 24 | $(95/15)^2$ |
| 23 | $(84/15)^2$ |
| 22 | $(75/15)^2$ |
| 21 | $(67/15)^2$ |
| 20 | $(60/15)^2$ |
| 19 | $(53/15)^2$ |
| 18 | $(47/15)^2$ |
| 17 | $(42/15)^2$ |
| 16 | $(38/15)^2$ |
| 15 | $(34/15)^2$ |
| 14 | $(30/15)^2$ |
| 13 | $(27/15)^2$ |
| 12 | $(24/15)^2$ |
| 11 | $(21/15)^2$ |
| 10 | $(19/15)^2$ |
| 9 | $(17/15)^2$ |
| 8 | $(15/15)^2$ |
| 7 | $(13/15)^2$ |
| 6 | $(12/15)^2$ |
| 5 | $(11/15)^2$ |
| 4 | $(9/15)^2$ |
| 3 | $(8/15)^2$ |
| 2 | $(7/15)^2$ |
| 1 | $(6/15)^2$ |
| 0 | $(5/15)^2$ |

TRANSMISSION RATE CONTROL METHOD, MOBILE COMMUNICATION SYSTEM AND RADIO BASE STATION

CROSS REFERENCE TO RELATED APPLICATION

This application is based upon and claims the benefit of priority from prior Japanese Patent Application No. 2007-304991, filed on Nov. 26, 2007; the entire contents of which are incorporated herein by reference.

BACKGROUND OF THE INVENTION

1. Field of the Invention

The present invention relates to a transmission rate control method, a mobile communication system and a radio base station for controlling a transmission rate of uplink user data to be transmitted from a mobile station.

2. Description of the Related Art

In a conventional mobile communication system, when setting a dedicated channel, a radio network controller is configured to determine a transmission rate of uplink user data, in consideration of a radio resource of a radio base station, an amount of an interference in the uplink, a transmission power of a mobile station, a transmission processing performance of the mobile station, a transmission rate required for an upper application, and the like; and to notify the determined transmission rate of the uplink user data by a layer 3 (radio resource control layer) message to both of the mobile station and the radio base station.

Here, the radio network controller is provided at an upper level of the radio base station, and is an apparatus configured to control the radio base station and the mobile station.

In general, data communications often cause burst traffic compared with voice communications or TV communications. Therefore, it is preferable that a transmission rate of a channel used for the data communications is changed fast.

However, as shown in FIG. 1, a radio network controller integrally controls a plurality of radio base stations in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even when the fast control for changing of the transmission rate of the uplink user data can be performed.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept the radio bandwidth resources in an unoccupied state and hardware resources in the radio base station Node B are wasted.

In each of FIGS. 2B and 2C, "radio resource" on the vertical axis refers to both of the radio band resource and the hardware resource mentioned above. Hereinafter, a radio band resource and a hardware resource are collectively referred to as a "radio resource".

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

Hereinbelow, an example will be given for a control method of a radio resource (i.e., a transmission rate of uplink user data) for transmitting the uplink user data, which has been discussed in the "enhanced uplink".

In the control method, a radio base station NodeB is configured to assign a radio resource to be used for transmitting the uplink user data to each of mobile stations UE at a predetermined timing (TTI: transmission time interval).

The radio base station NodeB is configured to notify to each of the mobile stations UE by using an enhanced absolute grant channel (E-AGCH), an absolute grant (AG) corresponding to the radio resource to be assigned to each of the mobile stations UE.

The radio base station NodeB is also configured to notify, to each of the a mobile stations UE, a relative grant (RG), which indicates changes (UP/DOWN/HOLD) in a transmission rate of the uplink user data corresponding to the radio resource assigned to each of the mobile stations UE. The radio base station NodeB transmits the RG by use of an enhanced-relative grant channel (E-RGCH).

Specifically, as shown in FIG. 3, the radio base station NodeB is configured to notify, to each of the mobile stations UE1 to UE3, an SG corresponding to the radio resources assigned to each of the mobile stations UE1 to UE3, by use of an AG (granted value) or an RG (UP/DOWN/HOLD) through the E-AGCH or the E-RGCH.

Note that, in each TTI (sub-frame), the radio base station NodeB is configured to send a notification of the AG or the RG only to the mobile station allowed to transmit uplink user data through an enhanced-dedicated physical data channel (E-DPDCH).

Here, when the mobile stations UL1 to UE3 are not notified of the AG nor the RG, the mobile stations UE1 to UE3 continuously use the current SG. Note that, in a general mobile communication system, the SG assigned to the mobile stations UE1 to UE3 is set to be the same value for a period of several 10 ms to several 100 ms, in many cases.

A related technique is disclosed in International Patent Publication No. WO2005/039229.

However, the mobile communication system employing the "EUL" method as described above has the following problem. Detailed description will be given by referring to FIG. 4. In the mobile station UE3 of FIG. 4, transmission of uplink user data is completed in a sub-frame (2), and assigned radio resources are not used in a sub-frame (3)/(4). Thereafter, uplink user data to be transmitted is generated again in a sub-frame (5). In such case, a transmission power for transmitting an E-DPDCH from the mobile station UE is drastically increased during switching from the sub-frame (4) to the sub-frame (5). Accordingly, reception characteristics of the radio base station NodeB are deteriorated. Moreover, the dispersion of a received total wideband power (RTWP) measured at the radio base station NodeB is increased; thereby a measurement error becomes large.

Moreover, the radio resources assigned to the mobile station UE3 in the sub-frames (3) and (4) are excessive, and these radio resources are wasted since these radio resources cannot be used by the mobile stations UE1 and UE2.

SUMMARY OF THE INVENTION

A first aspect of the present invention is summarized as a transmission rate control method in which a radio base station controls a transmission rate of uplink user data to be transmitted from a mobile station, including: notifying, from the mobile station to the radio base station, a data amount in a transmission buffer of the mobile station; determining, at the radio base station, a maximum allowable value that can be notified to the mobile station, in accordance with the data amount in the transmission buffer, which is notified from the mobile station; calculating, at the radio base station, as a granted value to be notified to the mobile station, a value that does not exceed the maximum allowable value; notifying, from the radio base station to the mobile station, the granted value calculated at the radio base station, by using a transmission rate control channel; and transmitting, at the mobile station, the uplink user data, at a transmission rate corresponding to the granted value notified from the radio base station.

In the first aspect of the invention, in the determining, the radio base station may determine the maximum allowable value, when the radio base station determines to notify, to the mobile station, a value larger than a current granted value notified to the mobile station.

In the first aspect of the invention, the radio base station may determine so not to notify, to the mobile station, the value larger than the current granted value, when a monitoring timer is not terminated.

A second aspect of the present invention is summarized as a transmission rate control method in which a radio base station controls a transmission rate of uplink user data to be transmitted from a mobile station, including: notifying, from the mobile station to the radio base station, a data amount in a transmission buffer of the mobile station; determining, at the radio base station, a maximum allowable increment of a current granted value notified to the mobile station, in accordance with the data amount in the transmission buffer, calculating, at the radio base station, as a granted value to be notified to the mobile station, a value increasing the current granted value by an increment not more than the maximum allowable increment; notifying, from the radio base station to the mobile station, the granted value calculated at the radio base station, by using a transmission rate control channel; and transmitting, at the mobile station, the uplink user data, at a transmission rate corresponding to the granted value notified from the radio base station.

In the second aspect of the invention, in the determining, the radio base station may determine the maximum allowable increment, when the radio base station determines to notify, to the mobile station, a value larger than the current granted value.

In the second aspect of the invention, in the determining, the radio base station may determine not to notify, to the mobile station, the value larger than the current granted value, when a monitoring timer is not terminated.

In the second aspect of the invention, in the determining, the radio base station may determine not to notify, to the mobile station, the value larger than the current granted value, when the data amount in the transmission buffer is smaller than a predetermined threshold.

A third aspect of the present invention is summarized as a radio base station used in a mobile communication system in which a mobile station transmits uplink user data at a transmission rate corresponding to a granted value notified from the radio base station, including: a granted value determining unit configured to determine, in accordance with a data amount in a transmission buffer of the mobile station, a maximum allowable value that can be notified to the mobile station, the data amount being notified from the mobile station, and to calculate, as a granted value to be notified to the mobile station, a value that does not exceed the maximum allowable value; and a granted value notification unit configured to notify, to the mobile station, the granted value calculated at the granted value determining unit, by using a transmission rate control channel.

In the third aspect of the invention, the granted value determining unit may determine the maximum allowable value, when the radio base station determines to notify, to the mobile station, a value larger than a current granted value notified to the mobile station.

In the third aspect of the invention, the granted value determining unit may determine not to notify, to the mobile station, the value larger than the current granted value, when a monitoring timer is not terminated.

A fourth aspect of the present invention is summarized as a radio base station used in a mobile communication system in which a mobile station transmits uplink user data at a transmission rate corresponding to a granted value notified from the radio base station, including: a granted value determining unit configured to determine a maximum allowable increment of a current granted value notified to the mobile station, in accordance with a data amount in a transmission buffer of the mobile station, the data amount being notified from the mobile station, and to calculate, as a granted value to be notified to the mobile station, a value increasing the current granted value by an increment not more than the maximum allowable increment; and a granted value notification unit configured to notify, to the mobile station, the granted value calculated at the granted value determining unit, by using a transmission rate control channel, In the fourth aspect of the invention, the granted value determining unit may determine the maximum allowable increment, when the radio base station determines to notify, to the mobile station, a value larger than the current granted value.

In the fourth aspect of the invention, the granted value determining unit may determine not to notify, to the mobile station, the value larger than the current granted value, when a monitoring timer is not terminated.

In the fourth aspect of the invention, the granted value determining unit may determine not to notify, to the mobile station, the value larger than the current granted value, when the data amount in the transmission buffer is smaller than a predetermined threshold.

BRIEF DESCRIPTION OF THE DRAWINGS

FIG. 7 is a view showing an example of scheduling information included in the MAC-e PDU transmitted from the radio base station according to the first embodiment of the present invention.

FIG. 8 is a view showing an example of a correspondence relationship among "Index," "TEBS value" and "maximum AG value" used in a mobile communication system according to the first embodiment of the present invention.

FIG. 9 is a view showing an example of a correspondence relationship among "Index," "TEBS value" and "maximum allowable increment of AG" used in the mobile communication system according to the first embodiment of the present invention.

FIG. 10 is a view showing an example of the correspondence relationship among "Index," "TEBS value" and "maximum allowable increment of AG" used in the mobile communication system according to the first embodiment of the present invention.

FIG. 11 is a view showing an example of a correspondence relationship between "Index" and "SG" used in the mobile communication system according to the first embodiment of the present invention.

DETAILED DESCRIPTION OF THE PREFERRED EMBODIMENTS (Configuration of a Mobile Communication System According to a First embodiment of the Present Invention)

With reference to FIGS. 5 to 11, description will be given of a configuration of a mobile communication system according to a first embodiment of the present invention.

In the mobile communication system according to this embodiment, each mobile station UE is configured to transmit uplink user data at a transmission rate corresponding to an AG (granted value). The AG is notified through an E-AGCH from a radio base station NodeB.

Figure 1:
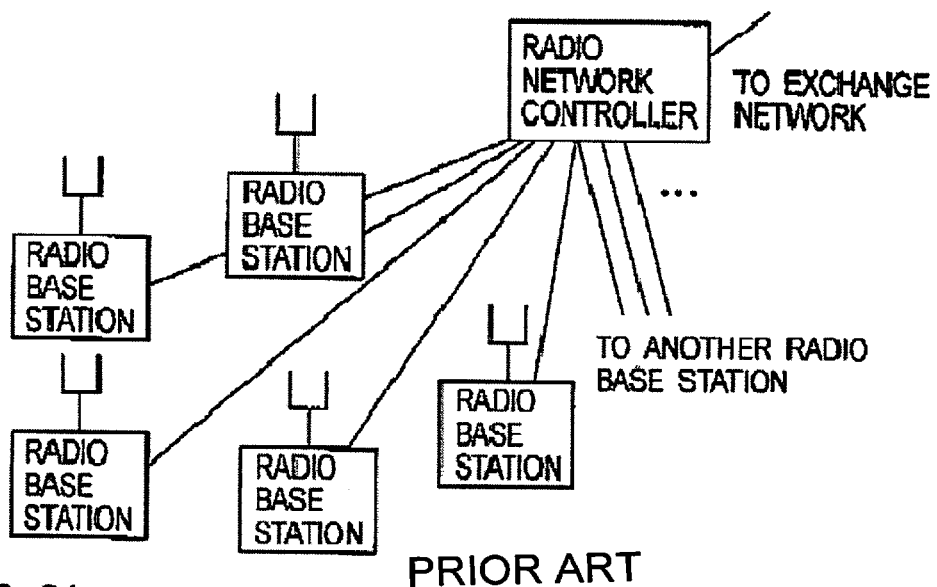
FIG. 1 is an overall configuration diagram of a general mobile communication system.
Figure 2A:
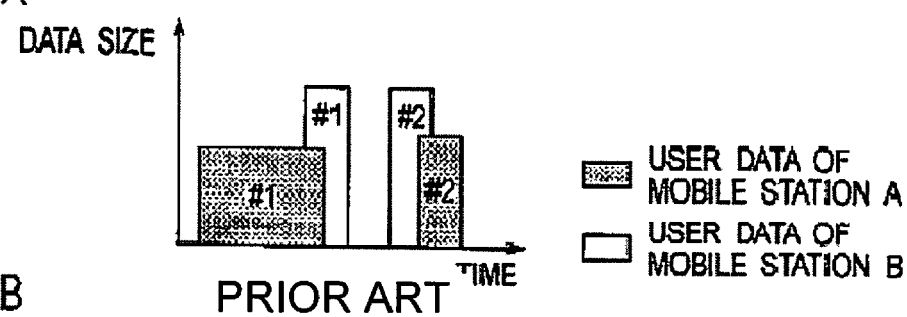
FIGS. 2A, 2B, and 2C are views for explaining an uplink transmission rate control method in a mobile communication system according to a conventional technique.
Figure 2B:
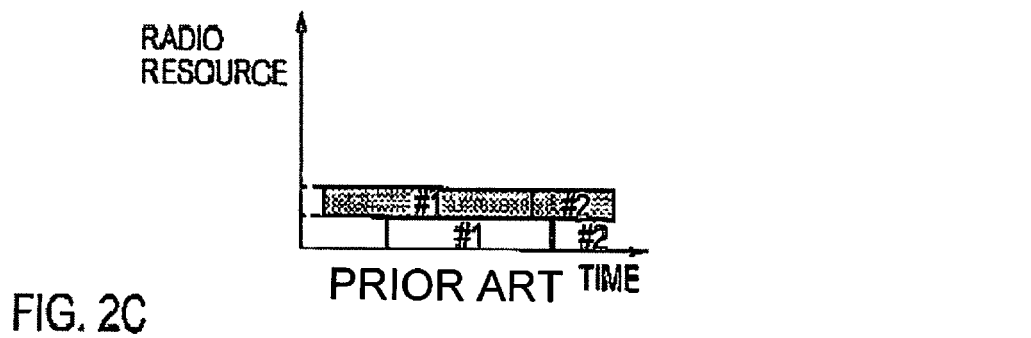
Figure 2C:
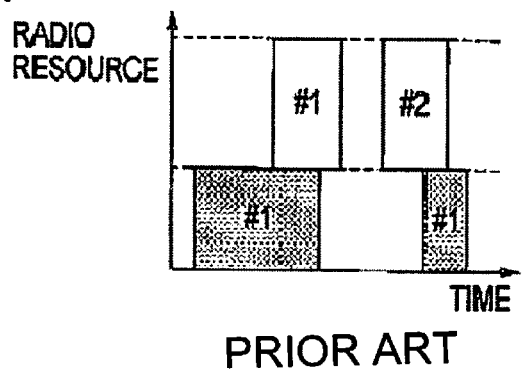
Figure 3:
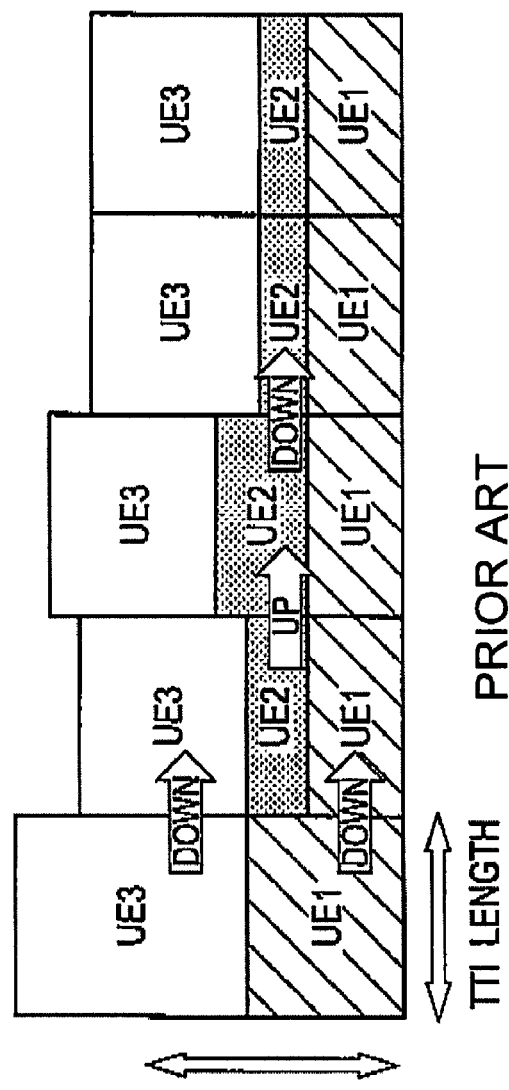
FIG. 3 is a view for explaining the uplink transmission rate control method in the mobile communication system according to the conventional technique.
Figure 4:
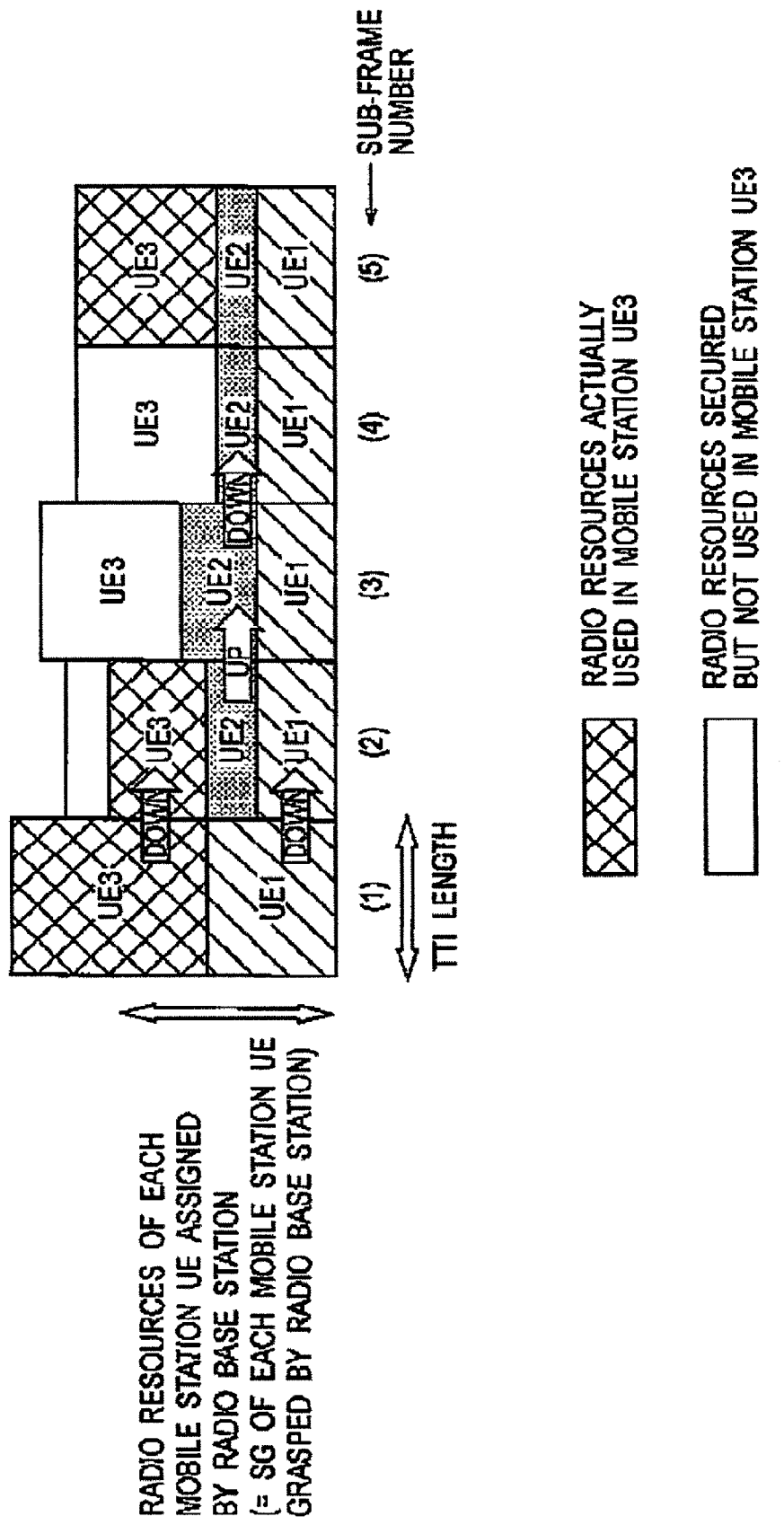
FIG. 4 is a view for explaining the uplink transmission rate control method in the mobile communication system according to the conventional technique.
Figure 5:
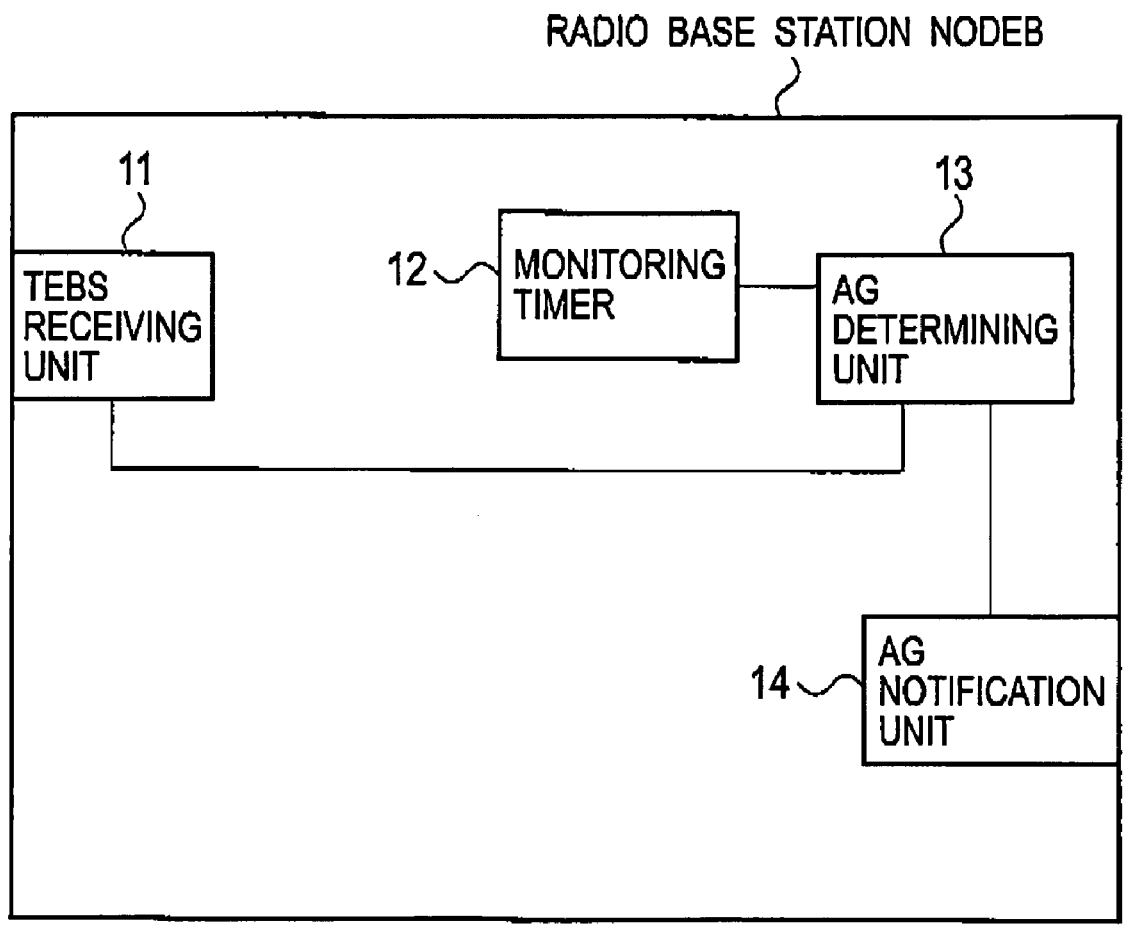
FIG. 5 is a functional block diagram showing a radio base station according to a first embodiment of the present invention.

As shown in FIG. 5, the radio base station NodeB according to this embodiment includes a TEBS receiving unit 11, a monitoring timer 12, an AG determining unit 13 and an AG notification unit 14.

The TEBS receiving unit 11 receives a total E-DCH buffer status (TEBS). TEBS indicates a data amount in a transmission buffer of the mobile station UE. Here, the data amount in the transmission buffer is notified from the mobile station UE.

Figure 6:
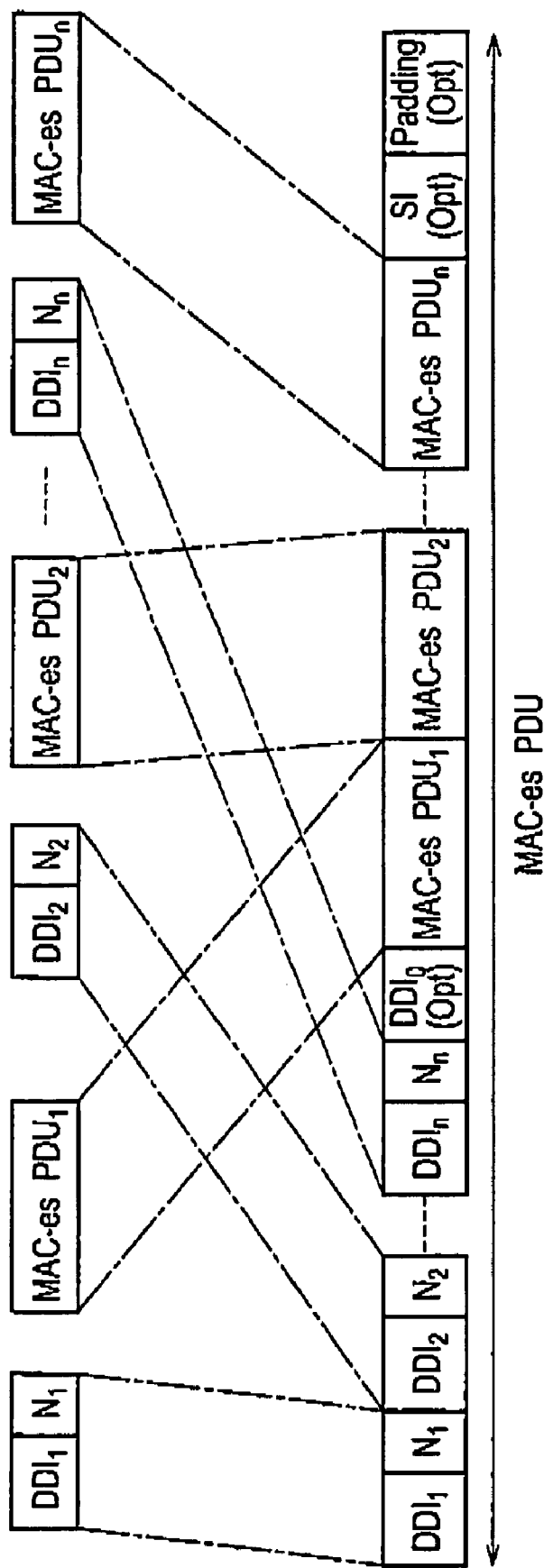
FIG. 6 is a view showing an example of a MAC-e PDU transmitted from the radio base station according to the first embodiment of the present invention.

To be more specific, the TEBS receiving unit 11 is configured to receive a "TEBS" (see FIG. 7) in "scheduling information (SI)" (see FIG. 6). The Si is included in "MAC-e PDU (defined by 3GPP TS25.321 figure 9.1.5.2a)" transmitted from the mobile station UE.

In this regard, the TEBS indicates a data amount in a transmission buffer to be transmitted by a specific logical channel.

The TEBS receiving unit 11 may be configured to receive, as the TEBS, an "Index" indicating an index corresponding to the data amount in the transmission buffer of the mobile station UE. Alternatively, the TEBS receiving unit may be configured to receive a "TEBS value" indicating the data amount itself in the transmission buffer of the mobile station UE.

Figure 7:
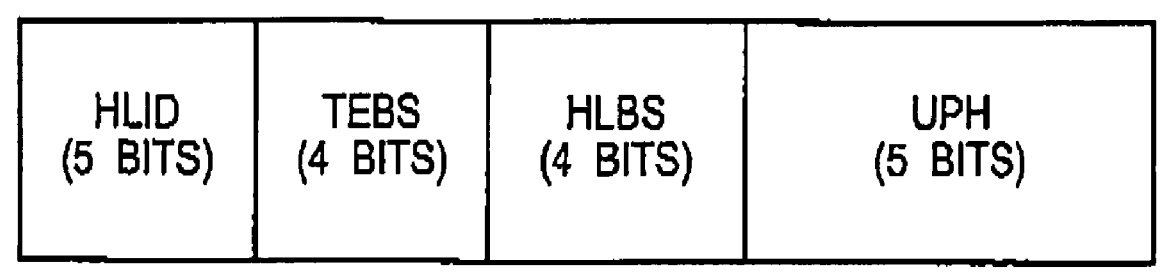

Note that, as shown in FIG. 7, the scheduling information includes, in addition to the "TEBS", "highest priority logical channel ID (HLID)", "highest priority logical channel buffer status (HLBS)", "UE power headroom (UPH)", and the like. "Highest priority logical channel ID (HLID)" indicates a logical channel ID having the highest priority. "Highest priority logical channel buffer status (HLBS)" indicates a data amount in a transmission buffer to be transmitted by the HLID. "UE power headroom (UPH)" indicates a transmission power ratio between a maximum allowable power of the mobile station UE and a DPCCH.

The monitoring timer 12 is started when a current granted value (AG) assigned to the mobile station UE is increased, and is terminated after a lapse of predetermined time. The monitoring timer 12 may be provided individually for each mobile station UE or may be shared among multiple mobile stations UE.

The AG determining unit 13 determines, in accordance with the TEBS (data amount in the transmission buffer of the mobile station) notified from the mobile station UE, a "maximum AG value (maximum allowable value)" that can be notified to the mobile station UE. Then, the AG determining unit 13 determines, as an AG to be notified to the mobile station UE, an AG (granted value) not more than the "maximum AG value (maximum allowable value)".

To be more specific, as shown in FIG. 8, the AG determining unit 13 has a table associating "Index", "TEBS value" and "maximum AG value" with each other. The AG determining unit 13 determines "maximum AG value" corresponding to the TEBS ("Index" or "TEBS value") received at the TEBS receiving unit 11, as the maximum AG value that can be notified to the mobile station UE.

Thereafter, the AG determining unit 13 determines an AG that can be notified to the mobile station UE in consideration of available radio resources and the like. Then, the AG determining unit 13 compares the value of the AG thus determined in consideration of available radio resources and the like, and the maximum AG value so as to determine a smaller one to be an AG to be notified to the mobile station UE.

Alternatively, the AG determining unit 13 may determine a maximum allowable increment (the maximum allowable increment of AG) of the current granted value (AG) notified to the mobile station UE, in accordance with the data amount in the transmission buffer of the mobile station UE, and calculate, as an AG (granted value) to be notified to the mobile station UE, a value increasing the current AG (granted value) by an increment not more than the maximum allowable increment of AG.

To be more specific, as shown in FIG. 9, the AG determining unit 13 has a table associating "Index", "TEBS value" and "maximum allowable increment of AG" with each other. The AG determining unit 13 determines the "maximum allowable increment of AG" corresponding to the TEBS ("Index" or "TEBS value") received at the TEBS receiving unit 11, as the maximum allowable increment (maximum allowable increment of AG) of the current AG (granted value) to be notified to the mobile station UE.

Thereafter, the AG determining unit 13 determines an AG that can be notified to the mobile station UE in consideration of available radio resources and the like. Then, the AG determining unit 13 compares the value of the AG thus determined in consideration of available radio resources and the like, and the value calculated by increasing the current granted value by an increment not more than the maximum allowable increment of AG, so as to determine a smaller one to be an AG to be notified to the mobile station UE.

Note that, as shown in FIG. 10, the AG determining unit 13 may set the "maximum allowable increment of AG" corresponding to the "Index" of "0" and "1" respectively to be "0", and thus, the AG determining unit 13 may determine not to notify an AG (granted value) larger than the current AG (granted value) to the mobile station UE, when the data amount in the transmission buffer of the mobile station UE is smaller than a predetermined threshold ("10" in an example of FIG. 10). Here, the data amount is received at the TEBS receiving unit 11 of the radio base station NodeB.

Moreover, the AG determining unit 13 may be configured to determine the maximum AG value (maximum allowable value) or a maximum allowable increment of AG, when the AG determining unit 13 determines to notify the AG (granted value) larger than the AG (granted value) currently assigned to the mobile station UE.

Furthermore, the AG determining unit 13 may determine not to notify AG (granted value) larger than the current AG (granted value) notified to the mobile station UE unless the monitoring timer 12 is terminated.

The AG notification unit 14 notifies the calculated AG (granted value) to the mobile station UE by using an E-AGCH (transmission rate control channel).

Specifically, the AG notification unit 14 is configured to transmit to the mobile station UE, an E-AGCH including "Index" corresponding to the "AG value" calculated as the AG (granted value) to be notified to the mobile station UE. Here, the "AG value" is calculated on the basis of a table associating "Index" with "AG value" shown in FIG. 11.

(Operations of Mobile Communication System according to First Embodiment of the Invention)

Figure 12:
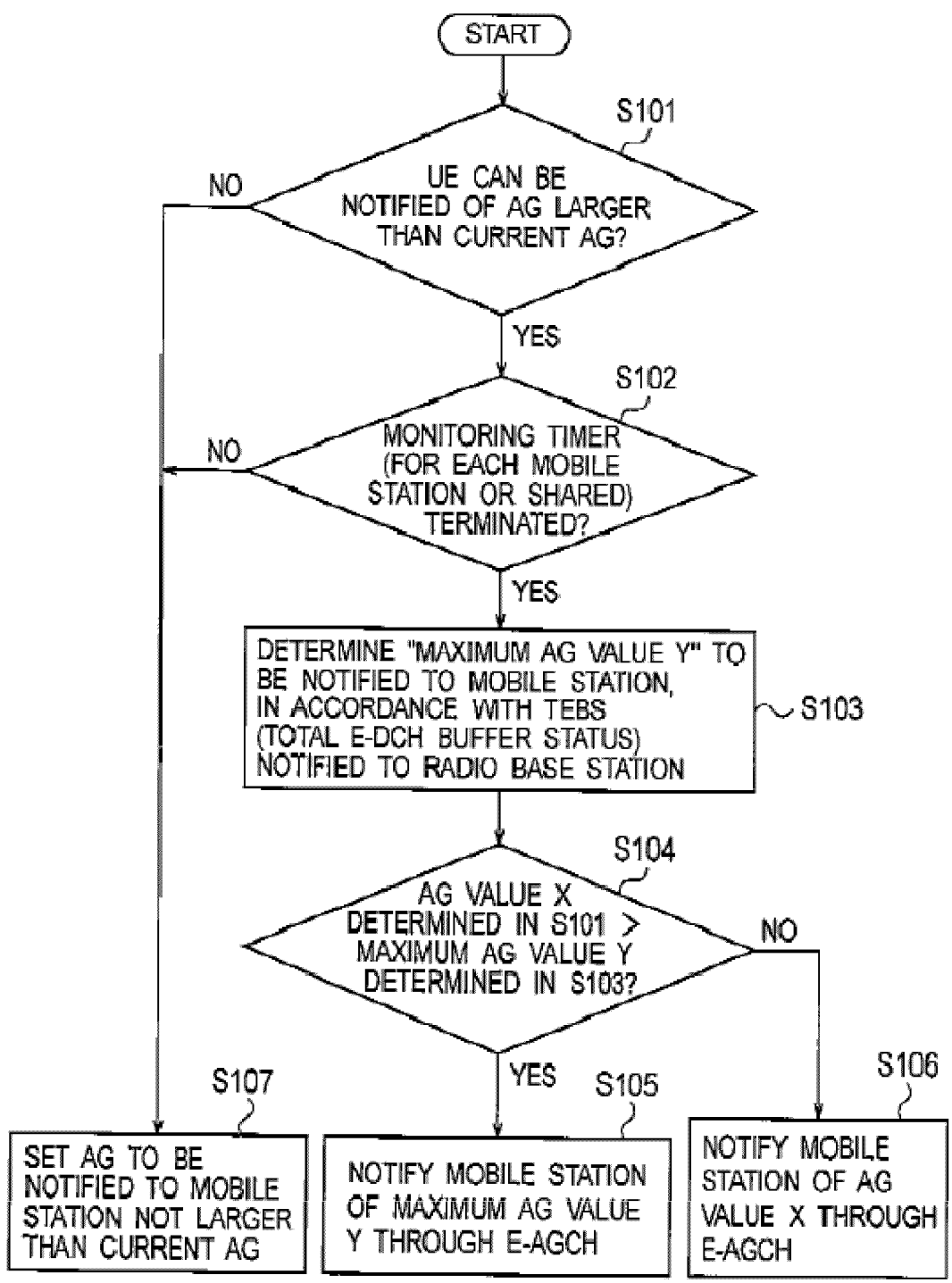
FIG. 12 is a flowchart showing operations of the mobile communication system according to the first embodiment of the present invention.
Figure 13:
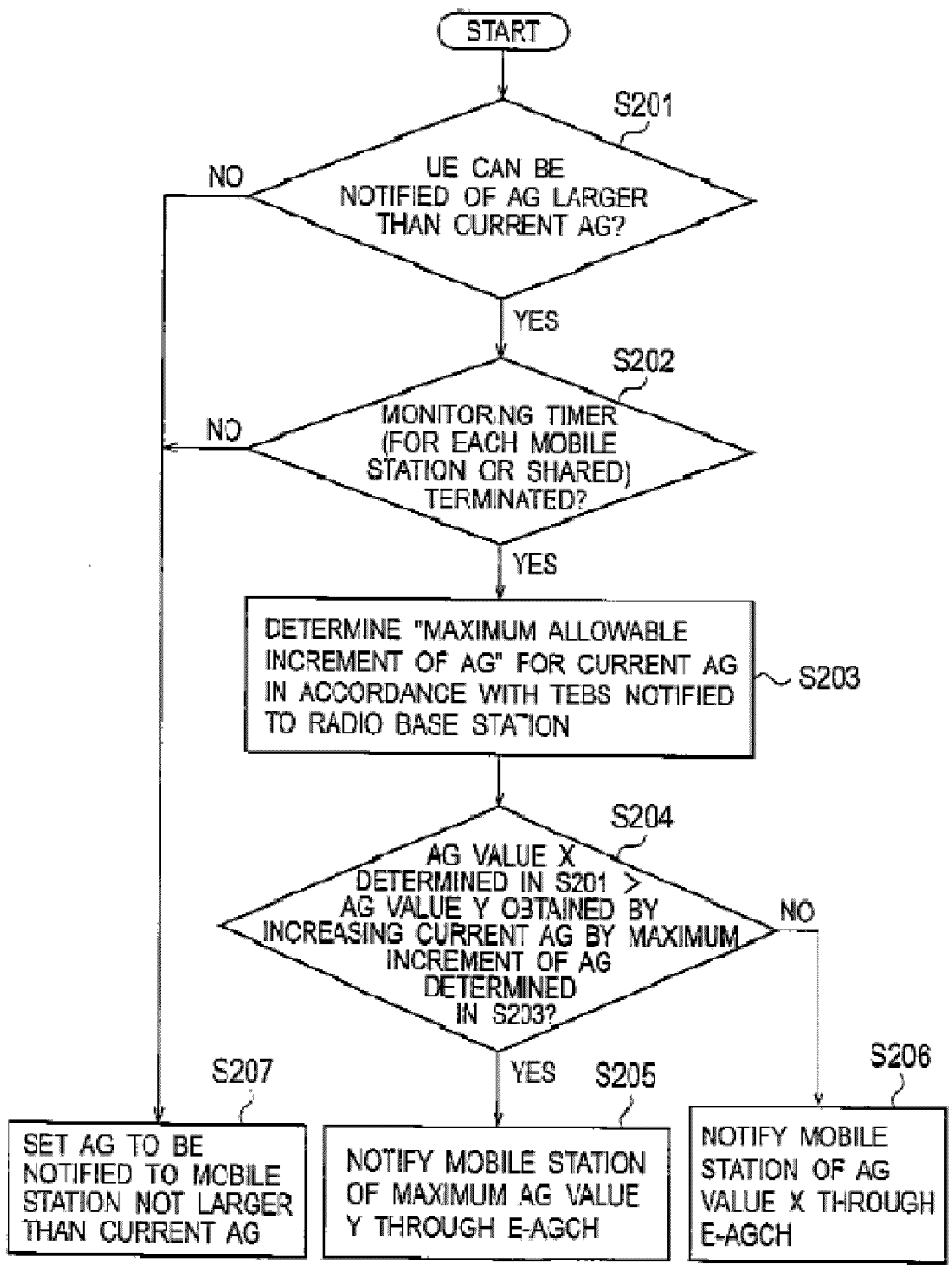
FIG. 13 is a flowchart showing operations of the mobile communication system according to the first embodiment of the present invention.

With reference to FIGS. 12 and 13, description will be given of operations of the radio base station NodeB according to the first embodiment of the present invention.

First, with reference to FIG. 12, a first operation of the radio base station NodeB will be described. As shown in FIG. 12, in Step S101, in consideration of available radio resources and the like, the radio base station NodeB determines whether or not a mobile station UE can be notified of an AG larger than the AG currently notified to the mobile station UE (AG value X).

When the radio base station NodeB determines the result in Step S101 is negative (NO), in Step S107, the radio base station NodeB determines not to set an SG of the mobile station UE to be larger than the current SG. Therefore, the radio base station NodeB does not notify the mobile station UE of the AG larger than the AG currently notified to the mobile station UE.

When the radio base station NodeB determines the result in Step S101 is positive (YES), in Step S102, the radio base station NodeB determines whether or not the monitoring timer 12 (a monitoring timer for the mobile station or a shared monitoring timer) is terminated.

When the radio base station NodeB determines the result in Step S102 is negative (NO), in Step S107, the radio base station NodeB determines not to set the SG of the mobile station UE to be larger than the current SG. Therefore, the radio base station NodeB does not notify the mobile station UE of the AG larger than the AG currently notified to the mobile station UE.

When the radio base station NodeB determines the result in Step S102 is positive (YES), in Step S103, the radio base station NodeB determines a maximum AG value Y that can be notified to the mobile station UE, in accordance with the TEBS ("Index" or "TEBS value") notified from the mobile station UE.

In Step S104, the radio base station NodeB compares an AG value X determined in Step S101 with the maximum AG value Y determined in Step S103.

When the AG value X is larger than the maximum AG value Y, in Step S105, the radio base station NodeB notifies, to the mobile station UE, the maximum AG value Y through an E-AGCH.

On the other hand, when the AG value X is not larger than the maximum AG value Y, in Step S106, the radio base station NodeB notifies, to the mobile station UE, the AG value X through the E-AGCH.

Secondly, with reference to FIG. 13, a second operation of the radio base station NodeB will be described. As shown in FIG. 13, in Step S201, in consideration of available radio resources and the like, the radio base station NodeB determines whether or not a mobile station UE can be notified of an AG larger than the AG currently notified to the mobile station UE (AG value X).

When the radio base station NodeB determines the result in Step S201 is negative (NO), in Step S207, the radio base station NodeB determines not to set an SG of the mobile station UE to be larger than the current SG. Therefore, the radio base station NodeB does not notify the mobile station UE of the AG larger than the AG currently notified to the mobile station UE.

When the radio base station NodeB determines the result in Step S201 is positive (YES), in Step S202, the radio base station NodeB determines whether or not the monitoring timer 12 (a monitoring timer for the mobile station or a shared monitoring timer) is terminated.

When the radio base station NodeB determines the result in Step S202 is negative (NO), in Step S207, the radio base station NodeB determines not to set the SG of the mobile station UE to be larger than the current SG. Therefore, the radio base station NodeB does not notify the mobile station UE of the AG larger than the AG currently notified to the mobile station UE.

When the radio base station NodeB determines the result in Step S202 is positive (YES), in Step S203, the radio base station NodeB determines a maximum allowable increment of the current AG notified to the mobile station, in accordance with the TEBS ("Index" or "TEBS value") notified from the mobile station UE.

In Step S204, the radio base station NodeB compares an AG value X determined in Step S201 with an AG value Y calculated by increasing the current AG by the maximum allowable increment of AG determined in Step S203. In other words, the AG value Y indicates a maximum AG value that satisfying the following conditions: 1) not more than a value obtained by increasing the current AG by the maximum allowable increment of AG determined in Step S203; and 2) a maximum AG value among "AG values" shown in FIG. 11.

For example, in FIG. 11, when the value obtained by increasing the current AG by the maximum allowable increment of AG determined in Step S203 is "$(100/15)^2$", the AG value Y is determined as "$(95/15)^2$".

When the AG value X is larger than the AG value Y, in Step S205, the radio base station NodeB notifies, to the mobile station UE, the AG value Y through the E-AGCH.

On the other hand, when the AG value X is not larger than the AG value Y, in Step S206, the radio base station NodeB notifies, to the mobile station UE, the AG value X through the E-AGCH.

(Operations and Effects of Mobile Communication System according to First Embodiment of the Invention)

The mobile communication system of this embodiment makes it possible to avoid a drastic increase of the transmission power of the E-DPDCH transmitted from the mobile station UE, in a mobile communication system to which an "EUL" method is applied. Accordingly, the mobile communication system according to this embodiment can solve problems caused by such drastic increase of the transmission power of the E-DPDCH.

Moreover, the mobile communication system according to this embodiment enables effective utilization of radio resources by reducing excessively occupied radio resources and properly securing the radio resources.

Note that the operations of the mobile station UE and radio base station NodeB described above may be implemented by hardware, by a software module executed by a processor, or by a combination of both.

The software module may be provided in any form of storage medium such as a random access memory (RAM), a flash memory, a read only memory (ROM), an erasable programmable ROM (EPROM), an electronically erasable and programmable ROM (EEPROM), a register, a hard disk, a removable disk and a CD-ROM.

Such a storage medium is connected to the processor so that the processor can read and write information from and into the storage medium. Moreover, the storage medium may be integrated in the processor. Furthermore, the storage medium and the processor may be provided in an ASIC. The ASIC may be provided in a mobile station UE and a radio base station eNB. Moreover, the storage medium and the processor may be provided as discrete components in the mobile station UE and the radio base station eNB.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplar description and does not limit the present invention in any way.

What is claimed is:

1. A transmission rate control method in which a radio base station controls a transmission rate of uplink user data to be transmitted from a mobile station, comprising:
   notifying, from the mobile station to the radio base station, a data amount in a transmission buffer of the mobile station;
   determining, at the radio base station, a maximum allowable value that can be notified to the mobile station, in accordance with the data amount in the transmission buffer, which is notified from the mobile station;
   determining, at the radio base station, a first transmission value based upon consideration of available radio resources;
   calculating, at the radio base station, as a granted value to be notified to the mobile station, the smaller of the first transmission value and the maximum allowable value;
   notifying, from the radio base station to the mobile station, the granted value calculated at the radio base station, by using a transmission rate control channel; and
   transmitting, at the mobile station, the uplink user data, at a transmission rate corresponding to the granted value notified from the radio base station.

2. The transmission rate control method according to claim 1, wherein,
   in the determining, the radio base station determines the maximum allowable value, when the radio base station determines to notify, to the mobile station, a value larger than a current granted value notified to the mobile station.

3. The transmission rate control method according to claim 2, wherein
   the radio base station determines not to notify, to the mobile station, the value larger than the current granted value, when a monitoring timer is not terminated.

4. A transmission rate control method in which a radio base station controls a transmission rate of uplink user data to be transmitted from a mobile station, comprising:
   notifying, from the mobile station to the radio base station, a data amount in a transmission buffer of the mobile station;
   determining, at the radio base station, a maximum allowable increment of a current granted value notified to the mobile station, in accordance with the data amount in the transmission buffer,
   determining, at the radio base station, a first transmission value based upon consideration of available radio resources;
   calculating, at the radio base station, as a granted value to be notified to the mobile station, a value increasing the current granted value by an increment not more than the smaller of the first transmission value and the maximum allowable increment;
   notifying, from the radio base station to the mobile station, the granted value calculated at the radio base station, by using a transmission rate control channel; and
   transmitting, at the mobile station, the uplink user data, at a transmission rate corresponding to the granted value notified from the radio base station.

5. The transmission rate control method according to claim 4, wherein,
   in the determining, the radio base station determines the maximum allowable increment, when the radio base station determines to notify, to the mobile station, a value larger than the current granted value.

6. The transmission rate control method according to claim 5, wherein
   the radio base station determines not to notify, to the mobile station, the value larger than the current granted value, when a monitoring timer is not terminated.

7. The transmission rate control method according to claim 5, wherein
   the radio base station determines not to notify, to the mobile station, the value larger than the current granted value, when the data amount in the transmission buffer is smaller than a predetermined threshold.

8. A radio base station used in a mobile communication system in which a mobile station transmits uplink user data at a transmission rate corresponding to a granted value notified from the radio base station, comprising:
   a granted value determining unit configured to:
      determine, in accordance with a data amount in a transmission buffer of the mobile station, a maximum allowable value that can be notified to the mobile station, the data amount being notified from the mobile station,
      determine a first transmission value based upon consideration of available radio resources; and
      to calculate, as a granted value to be notified to the mobile station, the smaller of the first transmission value and the maximum allowable value; and
   a granted value notification unit configured to notify, to the mobile station, the granted value calculated at the granted value determining unit, by using a transmission rate control channel.

9. The radio base station according to claim 8, wherein the granted value determining unit determines the maximum allowable value, when the radio base station determines to notify, to the mobile station, a value larger than a current granted value notified to the mobile station.

10. The radio base station according to claim 9, wherein the granted value determining unit determines not to notify, to the mobile station, the value larger than the current granted value, when a monitoring timer is not terminated.

11. A radio base station used in a mobile communication system in which a mobile station transmits uplink user data at a transmission rate corresponding to a granted value notified from the radio base station, comprising:

a granted value determining unit configured to:

determine a maximum allowable increment of a current granted value notified to the mobile station, in accordance with a data amount in a transmission buffer of the mobile station, the data amount being notified from the mobile station, determine a first transmission value based upon consideration of available radio resources; and to calculate, as a granted value to be notified to the mobile station, a value increasing the current granted value by an increment not more than the smaller of the first transmission value and the maximum allowable increment; and a granted value notification unit configured to notify, to the mobile station, the granted value calculated at the granted value determining unit, by using a transmission rate control channel.

12. The radio base station according to claim 11, wherein the granted value determining unit determines the maximum allowable increment, when the radio base station determines to notify, to the mobile station, a value larger than the current granted value.

13. The radio base station according to claim 12, wherein the granted value determining unit determines not to notify, to the mobile station, the value larger than the current granted value, when a monitoring timer is not terminated.

14. The radio base station according to claim 12, wherein the granted value determining unit determines not to notify, to the mobile station, the value larger than the current granted value, when the data amount in the transmission buffer is smaller than a predetermined threshold.

* * * * *